United States Patent
Lee

(10) Patent No.: US 7,756,477 B2
(45) Date of Patent: Jul. 13, 2010

(54) DEVICE AND METHOD FOR SEARCHING FOR AND CONNECTING TO BLUETOOTH DEVICES

(75) Inventor: Jong-Kyu Lee, Gwacheon-si (KR)

(73) Assignee: Samsung Electronics Co., Ltd (KR)

( * ) Notice: Subject to any disclaimer, the term of this patent is extended or adjusted under 35 U.S.C. 154(b) by 654 days.

(21) Appl. No.: 11/708,694

(22) Filed: Feb. 20, 2007

(65) Prior Publication Data

US 2007/0213008 A1 Sep. 13, 2007

(30) Foreign Application Priority Data

Feb. 17, 2006 (KR) .................. 10-2006-0015562

(51) Int. Cl.
*H04B 7/00* (2006.01)

(52) U.S. Cl. .................. 455/41.2; 455/432.1; 455/436; 455/414.1; 455/557; 455/556.2; 455/500; 455/507; 370/331; 370/338

(58) Field of Classification Search ............... 455/41.2, 455/432.1, 436, 414.1, 550.1, 556.2, 500, 455/507
See application file for complete search history.

(56) References Cited

U.S. PATENT DOCUMENTS

| | | | |
|---|---|---|---|
| 6,633,757 B1 * | 10/2003 | Hermann et al. | 455/414.1 |
| 6,665,549 B1 * | 12/2003 | Reed | 455/573 |
| 6,678,516 B2 * | 1/2004 | Nordman et al. | 455/414.1 |
| 6,850,503 B2 * | 2/2005 | Dorenbosch et al. | 370/331 |
| 6,973,306 B2 * | 12/2005 | Kim | 455/426.1 |
| 7,231,212 B2 * | 6/2007 | Arazi et al. | 455/436 |
| 7,274,934 B2 * | 9/2007 | Arazi et al. | 455/436 |
| 7,567,820 B2 * | 7/2009 | Bitran et al. | 455/552.1 |
| 2003/0012219 A1 | 1/2003 | Joo | |
| 2006/0217061 A1 * | 9/2006 | Steele et al. | 455/3.06 |

FOREIGN PATENT DOCUMENTS

| | | |
|---|---|---|
| KR | 1020030006246 | 1/2003 |
| KR | 1020030064946 | 8/2003 |
| KR | 1020050033181 | 4/2005 |

* cited by examiner

*Primary Examiner*—Marceau Milord
(74) *Attorney, Agent, or Firm*—The Farrell Law Firm, LLP

(57) ABSTRACT

Disclosed are a device and method for searching and connecting to Bluetooth devices. A Host Device restricts the Bluetooth transmit power below a preset level, so as to limit the transmission range of an HCI inquiry signal output from the Host Device. When two or more Bluetooth devices are detected within the restricted transmit range, the Host Device compares the intensities of response signals received from the Bluetooth devices, and then selects a Bluetooth device having the response signal with the greatest intensity. Next, the Host Device attempts to connect to the selected Bluetooth device and starts to provide Bluetooth services. Thus, it is possible to restrict the Bluetooth devices detected according to the restricted transmission power. Further, the Host Device can connect to the Bluetooth device located at the nearest position, thereby making it possible for a user to easily and conveniently start a Bluetooth device service.

10 Claims, 4 Drawing Sheets

DEVICE AND METHOD FOR SEARCHING FOR AND CONNECTING TO BLUETOOTH DEVICES

PRIORITY

This application claims priority to an application entitled "Device and Method For Searching For And Connecting To Bluetooth Device" filed with the Korean Intellectual Property Office on Feb. 17, 2006 and assigned Serial No. 2006-15562, the contents of which are incorporated herein by reference.

BACKGROUND OF THE INVENTION

1. Field of the Invention

The present invention relates to Bluetooth devices, and more particularly to a device and method for searching for and connecting to Bluetooth devices.

2. Description of the Related Art

Generally, Bluetooth® (hereinafter "Bluetooth") is a specification for wireless access of various Bluetooth devices capable of automatically and manually searching for another Bluetooth device so as to maintain a connection status with the other Bluetooth devices at a rate of 1 Mbps using a frequency of 2.4 GHz Industrial, Scientific, and Medical (ISM) band. Bluetooth devices are set to recognize another Bluetooth device whose address is set according to Bluetooth devices thereby allowing communication using a Bluetooth communication scheme.

Referring to FIG. 1, a Host Device 100 provided with a Bluetooth module is located adjacent to a Headset 102, a Laptop Computer 104, a Printer 106 and a Portable Terminal 108, which respectively have a Bluetooth module.

In this case, the Host Device 100 transmits Bluetooth Host Controller Interface (HCI) inquiry signals to the above-mentioned devices. Here, words "HCI inquiry signals" refer to signals by which the Host Device searches for peripheral Bluetooth devices. The Bluetooth devices receiving the HCI inquiry signals transmit response signals to the host device 100.

Here, the response signal of the Bluetooth device includes address information on the Bluetooth devices, i.e. BD address, and information on services which the Bluetooth device provides. Therefore, when the Host device 100 transmits the HCI inquiry signal, the host device 100 can identify services that a currently connected Bluetooth device may provide, as well as whether the currently connected Bluetooth device exists.

The Host Device 100 displays the address information of the Bluetooth devices and information on the services that the Bluetooth devices may provide in the form of a list, these services are identified through the response signals of the Bluetooth devices. Thus, a user can obtain information on the address and the service of the currently connected Bluetooth devices from the displayed list of the Bluetooth devices, and contact at least one Bluetooth device. As a result, a user can transmit or receive data using the Bluetooth communication scheme.

However, a user may only connect with one device at a time through Bluetooth communication. For example, where the Host Device 100 is an MP3 player supporting Bluetooth communication, among the Bluetooth devices shown in FIG. 1, only the Headset 102 may be connected to the MP3 player through the Bluetooth communication.

As shown in FIG. 1, the Host Device 100 detects four Bluetooth devices such as the Headset 102, a Laptop Computer 04, a Portable Terminal 108, and a Printer 106. Further, the Host Device 100 receives the response signals, including BD address and service information, from all the Bluetooth devices, and provides a user with the received information on the four Bluetooth devices. Then, the Host Device connects with one Bluetooth device through the Bluetooth communication according to user selection.

As described above, the conventional Bluetooth communication scheme detects Bluetooth devices which a user may not need, and performs reception of response signals from the Bluetooth devices. Accordingly, time is wasted in connecting to a Bluetooth device which a user may not need. In addition, since the Host Device is allowed to unnecessarily display other Bluetooth devices for the user, it is then inconvenient for the user to search for a desired Bluetooth device.

SUMMARY OF THE INVENTION

Accordingly, the present invention has been developed to solve the above-mentioned problems occurring in the prior art, and it is an object of the present invention to provide a device and method for searching for and connecting to Bluetooth devices, which restrictively detects only a Bluetooth device needed by a user, and connects to only the detected Bluetooth device reducing time spent on the Bluetooth connection.

It is another object of the present invention to provide a device and method for searching for and connecting to a Bluetooth device, which can connect to only a Bluetooth device needed by a user so as to further enhance ease of use.

In order to accomplish these objects of the present invention, there is provided a device for searching for and connecting to Bluetooth devices, which can search for and connect to at least one Bluetooth device using Bluetooth communication, which includes a Bluetooth signal transceiver for transmitting a Host Controller Interface (HCI) inquiry signal to at least one Bluetooth device, and receiving and outputting a response signal from the Bluetooth device in response to the HCI inquiry signal; a detector for receiving the response signal and detecting the intensity of the response signal so as to output the intensity value of the detected signal; and a controller for controlling the Bluetooth signal transceiver according to the preset HCI inquiry signal transmission power so as to constrict the transmission power to transmit the HCI inquiry signal, and selecting a Bluetooth device, which has the response signal with the greatest intensity from the Bluetooth devices, so as to perform a connection to the selected Bluetooth device.

According to another aspect of the present invention, there is provided a method for searching for and connecting to Bluetooth devices, by which a host device can search for and connect to at least one Bluetooth device using a Bluetooth communication, the method including constricting the transmission power of a HCI inquiry signal according to preset HCI inquiry signal transmission power; detecting if there are Bluetooth devices which transmit a response signal in response to the transmitted HCI inquiry signal; identifying if a plurality of Bluetooth devices is detected; detecting intensities of the response signals received from the Bluetooth devices respectively, in the case where the Bluetooth devices are detected; and selecting a Bluetooth device corresponding to a signal with the greatest intensity value among the response signals so as to connect the host device to the selected Bluetooth device through the Bluetooth communication.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
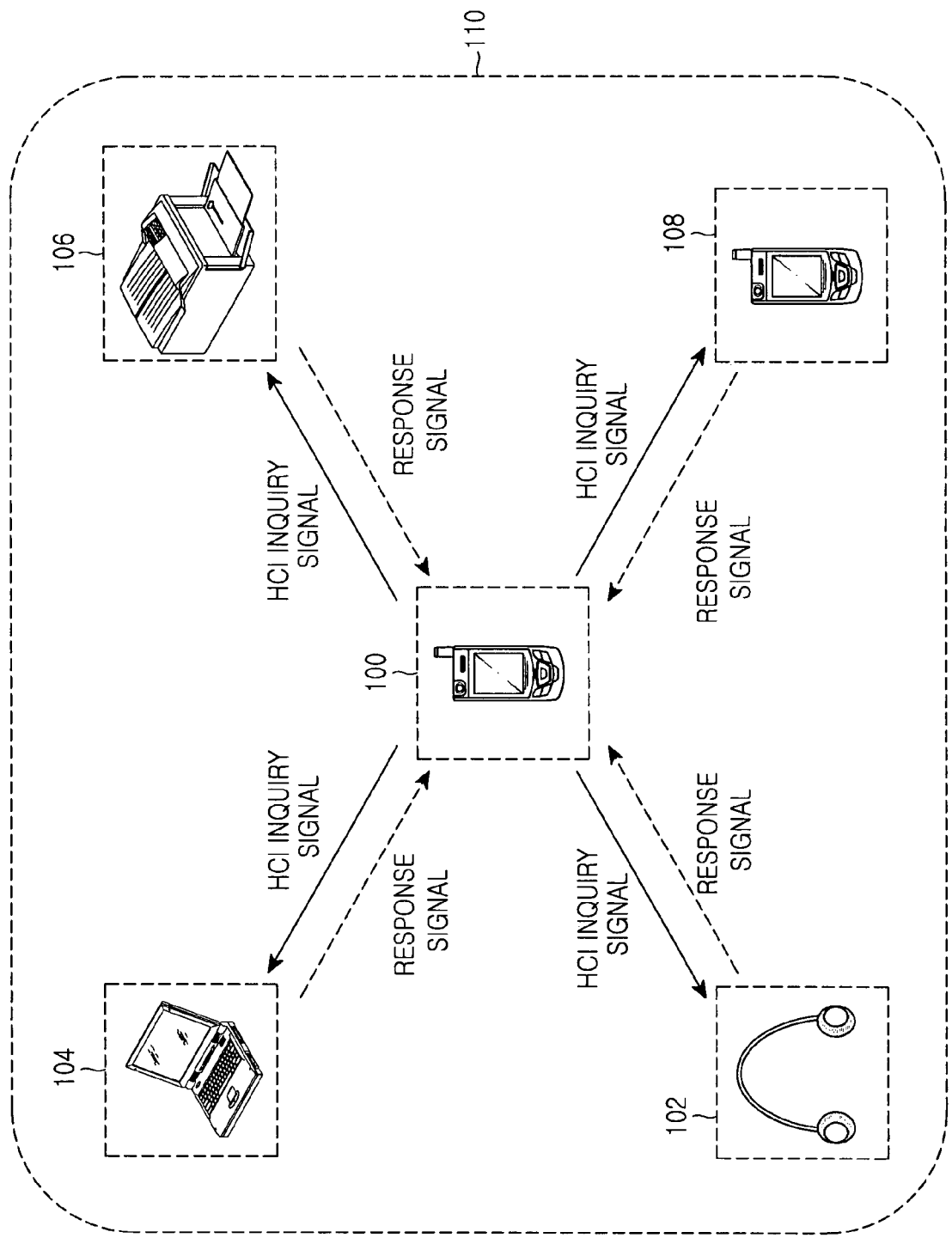
FIG. 1 illustrates a conventional process for search for and connecting to Bluetooth devices.

Hereinafter, a preferred embodiment of the present invention will be described in detail with reference to the accompanying drawings. The same reference numerals are used to denote the same structural elements throughout the drawings. In the following description, detailed description of known functions and configurations incorporated herein will be omitted to avoid making the subject matter of the present invention unclear.

First, the fundamental principle of the present invention will be described in order to help in understanding the present invention. In the present invention, a Host Device having a Bluetooth function restricts Bluetooth transmission power below a preset level, thereby limiting the range of transmitting a Host Controller Interface (HCI) inquiry signal. In the case where two or more Bluetooth devices are detected within the limited transmission range, the Host Device compares the intensities of response signals received from the Bluetooth devices with one another, and selects the Bluetooth device having the greatest intensity. Then, the Host Device tries to connect to the selected Bluetooth device and starts to provide Bluetooth service. Thus, the present invention can restrict the Bluetooth devices detected according to the limited transmission power.

Figure 2:
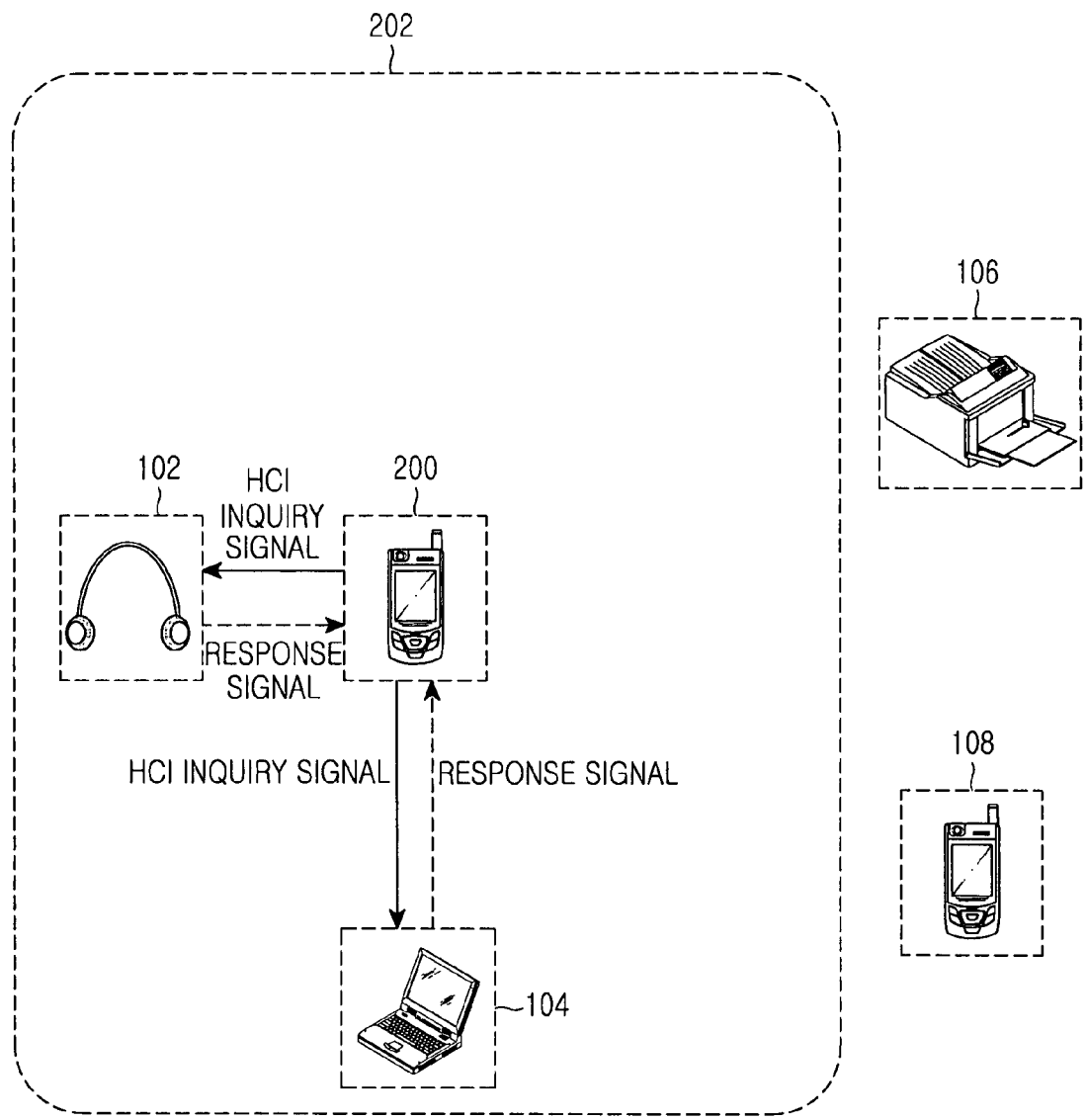
FIG. 2 illustrates a process for searching and connecting to Bluetooth devices according to the present invention.

Referring to FIG. 2, it will be known that the Host Device 200 according to the present invention has an HCI inquiry signal transmission range 202 narrower than the HCI inquiry signal transmission range 110 of a conventional Host Device 100 shown in FIG. 1. This is because the Host Device 200 according to the present invention restricts the transmission power of the HCI inquiry signal to the preset level. Thus, an HCI inquiry signal having a lower transmission power than that of the conventional Host Device 100 is transmitted. As a result, the present invention can restrict the range of transmitting of the HCI inquiry signal. Further, in the present invention, the Host Device 200 can detect only the Bluetooth devices located within the transmission range according to the restriction of the HCI transmission power.

Here, the transmission power of the HCI inquiry signal may be adjusted according to a user's selection. Specifically, according to the present invention, the Host Device 200 may detect the transmission power value of the HCI signal corresponding to each transmission range, for example the transmission power of the HCI signal may be restricted to the transmission range of 10 cm, 20 cm, and 30 cm, as selected by a user. Accordingly, the Host Device restricts the HCI signal transmission power resulting in improved ease of use, and selects only the Bluetooth device located at the desired distance.

In FIG. 2, the Host Device 200 according to the limited transmission power transmits the inquiry signal within the transmission range 202 of the HCI. Accordingly, the Host Device 200 can detect a headset 102 and a laptop computer operating within the transmission range of the HCI inquiry signal. In this case, the Host Device 200 selects the Bluetooth device having the response signal with the greatest intensity among the detected Bluetooth devices. Here, the reason for this is because a user generally approaches a desired Bluetooth device that he/she wants to connect to.

In the case of the standardized transmission power, the closer the Bluetooth device is located to the Host Device 200, the greater the intensity of the response signal is. Thus, the Host Device 200 determines that the Bluetooth device having the response signal with the greatest intensity is closer to the current Host Device 200, and recognizes the Bluetooth device to be one that a user selects. For example, in the case shown in FIG. 2, the Host Device 200 attempts to connect to the headset 102 through the Bluetooth communication, so as to perform a service. Thus, when the user situated at a position adjacent to the headset 102 and attempts to connect the Host Device through the Bluetooth communication, it is possible to connect the Host Device to the headset 102 without detecting the other Bluetooth devices 104, 106 and 108. Accordingly, the present invention can achieve the Bluetooth connection faster and easier.

Figure 3:
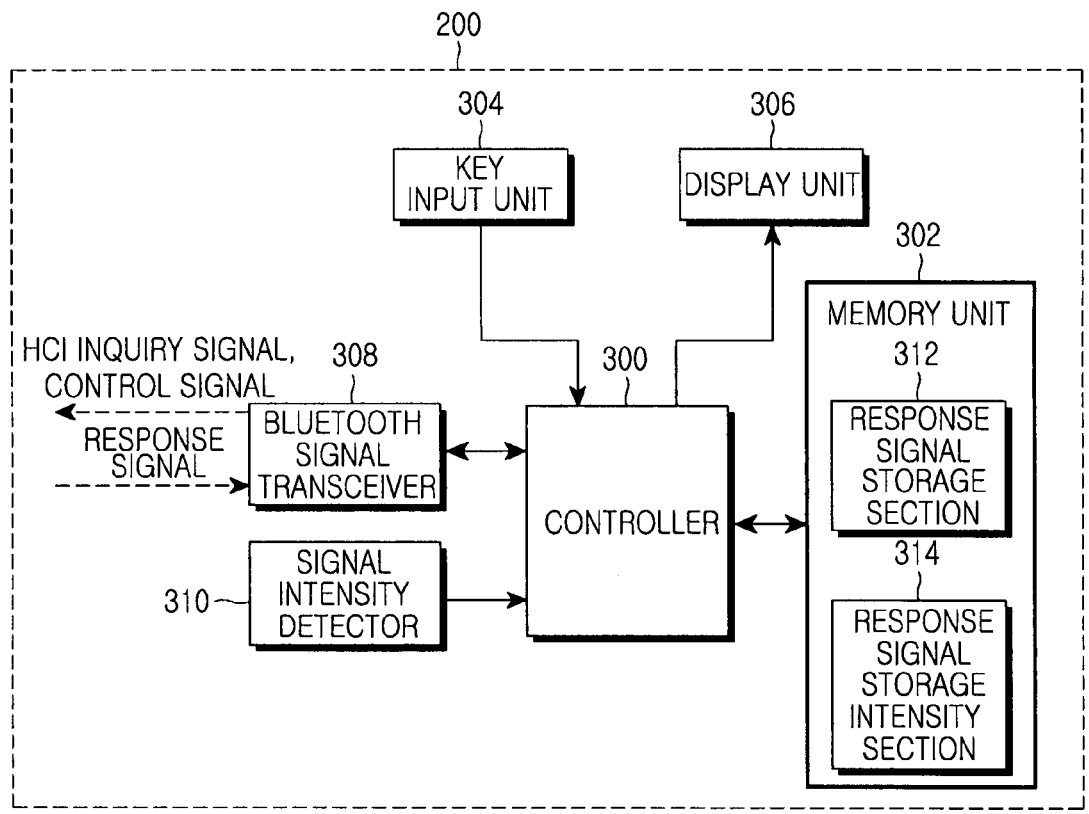
FIG. 3 is a block diagram illustrating a Host Device for searching and connecting to Bluetooth devices according to the present invention.

Referring to FIG. 3, the Host Device 200 according to the present invention includes a Key Input Unit 304, a Display Unit 306, a Memory Unit 302, a Signal Intensity Detector 310, a Bluetooth Signal Transceiver 308, and a Controller 300. The Key Input Unit 304, the Display Unit 306, the Memory Unit 302, the Signal Intensity Detector 310, and the Bluetooth Signal Transceiver 308 are coupled to the Controller 300. Here, the Controller 300 controls all units of the Host Device 200, and is coupled to the Bluetooth device through Bluetooth communication using BD address information and service information received from the near Bluetooth device. Further, the Controller 300 carries out an operation according to user's key inputs, and transmits a control signal for controlling the Bluetooth device coupled to the Host Device 200 and also transmits data such as video and audio data.

Furthermore, the Controller 300 restricts the transmission power of the HCI inquiry signal of the Bluetooth Signal Transceiver 308 according to the transmission range of the HCI inquiry signal which the user selects. When response signals are received from at least two Bluetooth devices in response to the transmitted HCI inquiry signal, the Controller 300 detects the intensity of the response signals through the Signal Intensity Detector 310. Then, the controller 300 selects the Bluetooth device having the response signal with the greatest intensity among the Bluetooth devices, and proceeds to connect the Host Device to the selected Bluetooth device through the Bluetooth communication.

The Memory Unit 302 coupled to the Controller 300 includes a region for storing the BD address information received from the Bluetooth devices and information on services which the Bluetooth device can provide, and a region for storing the intensities of response signals in order to extract the response signal having the greatest signal intensity when the signal intensity detector 310 receives the response signals output from the Bluetooth devices. Hereinafter, the storing region of the Memory Unit 302 for storing the BD address information and service information of the certain Bluetooth device will be referred to as a response signal storage section 312, and a storing region 302 for storing signal intensities of the response signals referred to as a signal intensity information storage section 314.

The Bluetooth Signal Transceiver 308 transmits the HCI inquiry signal according to the transmission power of the HCI inquiry signal restricted by the Controller 300. Further, the Bluetooth Signal Transceiver 308 receives response signals from the Bluetooth device receiving the HCI inquiry signal, and then applies the response signals to the Controller 300 and the Signal Intensity Detector 310 connected to the Controller 300. Further, the Bluetooth Signal Transceiver 308 transmits the control signal and data signals received from the Controller 300 to the Bluetooth device to which the Host Device is currently connected.

The Signal Intensity Detector 310 detects the signal intensity of the signals received from the Bluetooth Signal Transceiver 308, so as to apply the signal intensity value of the detected response signal to the Controller 300. On the other hand, the Key Input Unit 304 inputs the user's key inputs into the Controller 300, and the Display Unit 306 displays the service information on the Bluetooth device and the connection status of the corresponding Bluetooth device using the response signals received from the Bluetooth device to which the Host Device is currently connected.

Figure 4:
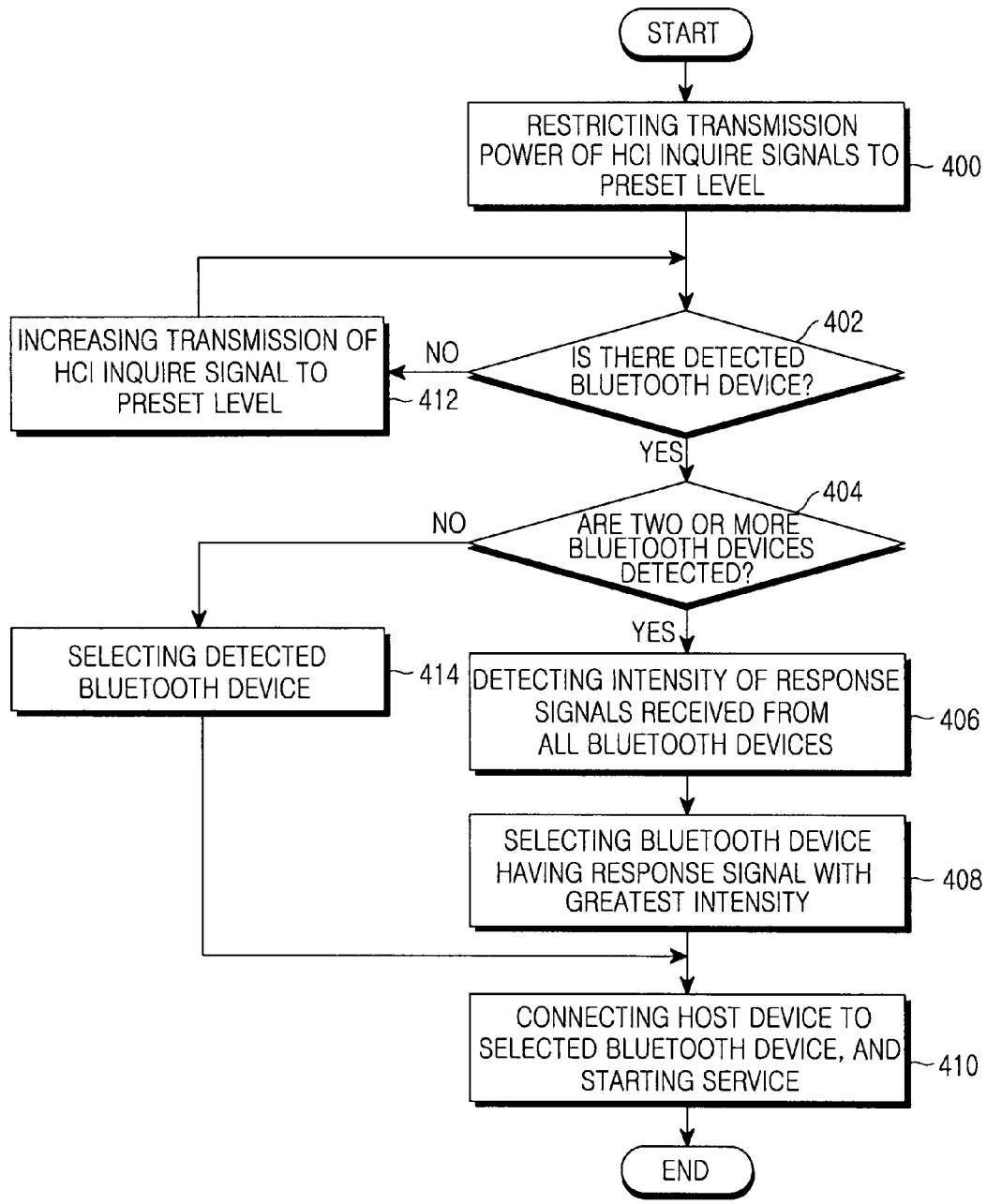
FIG. 4 is a flowchart illustrating operational processes of the host device for searching and connecting to Bluetooth devices according to the present invention.

Referring to FIG. 4, when the user selects the Bluetooth connection, the Controller 300 of the Host Device 200 according to the present invention proceeds to step 400, to restrict the Bluetooth transmission power according to a preset transmission level. Here, step 400 may include a process in which the user selects a transmission range of a HCI inquiry signal. In this case, the Controller 300 restricts the transmission power of the HCI transmission signal according to the transmission range of the HCI inquiry signal selected by the user. Thus, the Host Device 200 according to the present invention can transmit the HCI inquiry signals to only the Bluetooth device located within the transmission range of the HCI inquiry signal which the user selects.

The Controller 300 proceeds to step 402, and detects if Bluetooth devices exist within the transmission range of the currently set HCI inquiry signal. If no Bluetooth devices are detected at step 402, the Controller 300 may output an error message informing the user that no Bluetooth devices are detected. Otherwise, the Controller 300 gradually increases the transmission power of the HCI inquiry signal to the preset extent so as to detect the Bluetooth device located at the nearest position. In FIG. 4, step 412 is performed assuming that the intensity of the transmission power is gradually increased to the preset extent in the case where there is no Bluetooth device, which is currently detected at step 402. In this case, when the Bluetooth device is connected to the Host Device, a step of initializing the transmission power of the HCI inquiry signal restricted according to the initial setting of the user may be further included.

Meanwhile, if the Bluetooth device is detected at step 402, the Controller 300 proceeds to step 404 and checks if two or more Bluetooth devices are detected. If less than two Bluetooth devices are detected as the result of checking the Bluetooth devices at step 404, the Controller 300 proceeds to step 414, and selects the connection of the detected Bluetooth device. Then, the Controller 300 proceeds to step 410, and performs the connection to the Bluetooth device through the Bluetooth communication and service.

However, if at least two Bluetooth devices are detected at step 404, the controller 300 proceeds to step 406, and checks the intensity of the response signal received from each Bluetooth device. Then, the controller 300 selects the Bluetooth device having the response signal with the greatest intensity at step 408. The Controller 300 proceeds to step 410 to display BD address information and service information on the selected Bluetooth device according to the response signal received from the selected Bluetooth device, and performs the connection to the selected Bluetooth device and the Bluetooth service. If the two devices have the same relative intensity, the user can select one of the Bluetooth devices.

In the present invention, therefore, as the Host Device 200 transmits the HCI inquiry signal according to the transmission power of the restricted HCI inquiry signal, it is possible to avoid the detection of unnecessary Bluetooth devices. Further, when the response signals are received from two or more Bluetooth devices in response to the transmitted HCI inquiry signal, the Host Device selects and connects to the Bluetooth device corresponding to the response signal with the greatest intensity among the response signals received from all the Bluetooth devices, so as to allow the user to directly connect to the nearest Bluetooth device. Accordingly, the present invention can afford the user substantially reduced time in detecting and connecting the Bluetooth device to the Host Device, and to more conveniently connect to the desired Bluetooth device.

Therefore, the present invention detects only the Bluetooth device that the user desires, and attempts to connect to only the detected Bluetooth device, thereby reducing the time spent for connecting to Bluetooth devices. Further, the present invention connects the host device to only the Bluetooth device that the user desires, thereby further improving user's convenience.

Specifically, in the present invention, when two or more Bluetooth devices transmit the response signal in response to the HCI inquiry signal transmitted according to the restricted transmission power, the Host Device selects and connects to the Bluetooth device with the most intensive signal among the Bluetooth devices. While the invention has been shown and described with reference to the preferred embodiments thereof, it will be understood by those skilled in the art that various changes in form and details may be made therein without departing from the spirit and scope of the invention as further defined by the appended claims.

What is claimed is:

1. A device for searching and connecting to at least one Bluetooth device, the device comprising:
    a Bluetooth signal transceiver for transmitting a Host Controller Interface (HCI) inquiry signal to a plurality of Bluetooth devices, and receiving response signals from the plurality of Bluetooth devices in response to the HCI inquiry signal;
    a detector for detecting an intensity of each of the received response signals so as to output an intensity value of the detected signal; and
    a controller for controlling the Bluetooth signal transceiver for restricting a transmission power of the HCI inquiry signal to a preset transmission power of the HCI inquiry signal, selecting a Bluetooth device having the response signal with a greatest intensity among the received response signals, and connecting to the selected Bluetooth device.

2. The device as claimed in claim 1, wherein the set transmission power of the HCI inquiry signal is lower than a transmission power of an HCI inquiry signal according to a Bluetooth communication agreement.

3. The device as claimed in claim 1, wherein the controller restricts the transmission power of the HCI inquiry signal according to a transmission region inquiry which a user selects.

4. The device as claimed in claim 1, wherein the controller controls the Bluetooth signal transceiver according to the setting of the transmission power of the preset HCI inquiry signal, extracts only the response signals with the intensity value greater than a predetermined level when the plurality of Bluetooth device transmits the response signal, and selects a Bluetooth device from the plurality of Bluetooth devices corresponding to the extracted response signals so as to connect to the selected Bluetooth device.

5. A method for searching and connecting to at least one Bluetooth device, the method comprising the steps of:
- restricting a transmission power of a HCI inquiry signal according to preset transmission power of a HCI inquiry signal;
- detecting if there are a plurality of Bluetooth devices which transmit a response signal in response to the transmitted HCI inquiry signal;
- identifying if the plurality of Bluetooth devices are detected;
- detecting intensities of the response signals received from the plurality of Bluetooth devices; and
- selecting a Bluetooth device corresponding to the response signal with a greatest intensity among the response signals and connecting a host device to the selected Bluetooth device through a Bluetooth communication.

6. The method as claimed in claim 5, wherein the Bluetooth device detecting step comprises:
- detecting if there are the plurality of Bluetooth devices which transmit the response signals in response to the transmitted HCI inquiry signal; and
- increasing the transmission power of the HCI inquiry signal to the preset extent if there is no detected Bluetooth device resulting from the detection.

7. The method as claimed in claim 5, wherein the device identifying step comprises:
- identifying how many Bluetooth devices are detected, if any; and
- selecting and connecting the detected Bluetooth device to the host device, if only one Bluetooth device is detected.

8. The method as claimed in claim 5, wherein the set transmission power of the HCI inquiry signal is lower than the transmission power of an HCI inquiry signal according to a Bluetooth communication agreement.

9. The method as claimed in claim 5, wherein the transmission power restricting step comprises:
- selecting a transmission range, to which the HCI inquiry signal is transmitted, from a user;
- selecting a transmission power of the HCI inquiry signal according to the transmission range selected by the user; and
- restricting the transmission power of the HCI inquiry signal according to the selected transmission power of the HCI inquiry signal, so as to transmit the restricted HCI inquiry signal.

10. The method as claimed in claim 5, wherein the connecting step comprises:
- extracting response signals with greater intensity than a certain level from the response signals; and
- selecting from the plurality of Bluetooth devices corresponding to the extracted response signals a Bluetooth device with a greatest intensity, and connecting the selected Bluetooth device to the host device through the Bluetooth communication.

* * * * *